United States Patent
Sandstrom et al.

(10) Patent No.: US 8,670,667 B1
(45) Date of Patent: Mar. 11, 2014

(54) ACCESS MULTIPLEXERS AND METHODS FOR MULTIPLEXING TELECOMMUNICATION SIGNALS USING AN ARRAYED MEDIA CONVERTER

(75) Inventors: Leif J. Sandstrom, Madison, AL (US); Kevin W. Schneider, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 803 days.

(21) Appl. No.: 12/619,397

(22) Filed: Nov. 16, 2009

Related U.S. Application Data

(60) Provisional application No. 61/116,200, filed on Nov. 19, 2008, provisional application No. 61/121,978, filed on Dec. 12, 2008.

(51) Int. Cl.
*H04J 14/00* (2006.01)

(52) U.S. Cl.
USPC .......... 398/72; 398/68; 398/71; 398/66; 398/67; 398/100; 370/352; 370/392; 370/389; 370/468; 370/465; 725/105; 725/106; 725/125; 725/127; 725/129

(58) Field of Classification Search
USPC .......... 398/66, 67, 68, 69, 70, 71, 72, 98, 99, 398/100, 59, 79, 58, 75, 76, 135, 138, 139; 370/352, 392, 389, 465, 468, 342, 401, 370/351, 535; 725/105, 106, 125, 127, 129
See application file for complete search history.

(56) References Cited

U.S. PATENT DOCUMENTS

| | | | | |
|---|---|---|---|---|
| 6,523,177 | B1 * | 2/2003 | Brown | 725/121 |
| 6,678,375 | B1 | 1/2004 | Henderson | |
| 7,302,149 | B2 | 11/2007 | Swam et al. | |
| 7,331,819 | B2 | 2/2008 | Nelson et al. | |
| 7,371,014 | B2 | 5/2008 | Willis et al. | |
| 7,672,591 | B2 * | 3/2010 | Soto et al. | 398/72 |
| 2004/0081465 | A1 | 4/2004 | Kim et al. | |
| 2005/0207403 | A1 | 9/2005 | Katayama et al. | |
| 2006/0115269 | A1 * | 6/2006 | Shin et al. | 398/71 |
| 2006/0153566 | A1 * | 7/2006 | Sorin et al. | 398/72 |
| 2007/0238360 | A1 | 10/2007 | Khemakhem et al. | |

(Continued)

OTHER PUBLICATIONS

Schneider, U.S. Appl. No. 12/839,403, entitled, "Systems and Methods for Powering a Service Unit," filed Jul. 19, 2010.

(Continued)

*Primary Examiner* — Hanh Phan
(74) *Attorney, Agent, or Firm* — Maynard, Cooper & Gale, P.C.; Jon E. Holland

(57) ABSTRACT

The present disclosure generally pertains to an arrayed media converter (AMC) that has an array of Wavelength Division Multiplexing-Passive Optical Network (WDM-PON) Optical Network Units (ONUs) for terminating an optical channel in the feeder or distribution portion of a telecommunication network. The ONU converts an optical signal from the optical channel into at least one electrical signal for transmission to a customer premises. Thus, the AMC serves as an interface between at least one WDM-PON link and at least one conductive connection, such as a twisted pair. In one exemplary embodiment, the AMC comprises a sealed housing that is environmentally hardened to protect the AMC from environmental conditions, including changes in weather. Such an AMC may be used to provide a robust, cost effective Fiber To The Curb (FTTC) solution, but the AMC may be used at other points within the network, if desired.

32 Claims, 12 Drawing Sheets

(56) References Cited

U.S. PATENT DOCUMENTS

2009/0060531 A1    3/2009   Biegert
2009/0208212 A1*   8/2009   Lee et al. .................... 398/72
2010/0046946 A1*   2/2010   Cao et al. .................... 398/72
2010/0142689 A1    6/2010   Hansen et al.

OTHER PUBLICATIONS

Goodson, U.S. Appl. No. 13/178,243, entitled, "Systems and Methods for Extending Optical Network Services Across Non-Optical Channels," filed Jul. 7, 2011.

* cited by examiner

ACCESS MULTIPLEXERS AND METHODS FOR MULTIPLEXING TELECOMMUNICATION SIGNALS USING AN ARRAYED MEDIA CONVERTER

CROSS REFERENCE TO RELATED APPLICATIONS

This application claims priority to U.S. Provisional Patent Application No. 61/116,200, entitled "WDM-PON FTTC with Arrayed Media Converter," and filed on Nov. 19, 2008, which is incorporated herein by reference. This application also claims priority to U.S. Provisional Patent Application No. 61/121,978, entitled "WDMPON-FTTC with Arrayed Media Converter," and filed on Dec. 12, 2008, which is incorporated herein by reference.

RELATED ART

Telecommunication services have historically been delivered over the "last mile" (between a local exchange and the customer premises) over copper cable facilities. To support high-speed data services over these facilities, service providers employ digital communication links such as Asymmetric Digital Subscriber Line (ADSL) or other similar technologies over these copper facilities. A characteristic of DSL and the twisted-pair copper channel is that the achievable data rate decreases as the length of the copper pair increases. Therefore, to offer higher data rates, service providers have shortened the effective length of the copper pair by inserting the service provider transceiver of the DSL link at an intermediate point in the cable and using a shared fiber-optic facility to transport the signals between the exchange and the intermediate point (or node). The element that multiplexes the data from the DSL links onto the fiber optic link (and demultiplexes the inverse path) is often referred to as a DSL Access Multiplexer (DSLAM). Similar functionality may be integrated into other devices known by other names (e.g., Broadband Loop Carrier or Multi-Service Access Node). The DSLAM often performs some level of concentration. In this regard, the data rate on the fiber optic link often is less than the sum of the data rates on all of the DSL links, and the DSLAM uses statistical multiplexing of data packets (either variable length frames or fixed length frames often referred to as cells) to combine (or separate, depending on the direction the data is being transmitted) the different data streams from (or to) their respective DSL links.

There are some natural preferred locations for the DSLAM due to the design of the copper-cable facilities. The copper cable facilities are typically constructed of several sections: the feeder, distribution and drop. Between each of these sections there is often a terminal device that allows access to the individual pairs, allowing individual pairs from one section to connect to the other. These terminals also provide a natural location for the intermediate point DSLAM because of the ease of accessing the individual pairs to inject the DSL signal. When the fiber-fed DSLAM is located at the terminal/junction between the Feeder and Distribution sections, the architecture is often referred to as Fiber to the Node (FTTN), and when the DSLAM is located at the terminal/junction between the distribution and the drop sections, the architecture is often referred to as Fiber to the Curb (FTTC). FTTC architectures offer more flexibility in the technology and modulation format used in the digital transceiver because a drop cable often only contains pairs destined for a single customer premises. Because spectrum compatibility with signals to other customer premises is not required, it is often possible to use transceivers with lower complexity, cost, and power consumption than might be required in a FTTN architecture. In addition, the short length of the drop cable (typically about 500 feet or less) allows for a high data rate, potentially in excess of 100 Mega-bits per second (Mbps) in each direction. FTTC architectures have been deployed using both Very High Rate DSL (VDSL) links and 10BASE-T Ethernet links in the past.

While FTTC offers a very cost effective way for a service provider to deploy high-speed data services, demands for even higher speeds and less outside plant electronics have driven the development of Fiber to the Home (FTTH) or Fiber to the Building (FTTB) architectures, which employ fiber optic cable instead of copper cable for the drop section in addition to the feeder and distribution sections of the access network. While many types of FTTH/FTTB architectures have been developed and deployed, Passive Optical Network (PON) appears to have widespread adoption. PON architectures share a fiber for multiple customer premises in the feeder portion of the network, while each customer has a dedicated fiber in the drop and sometimes in the distribution network. One or more passive optical multiplexer devices (often referred to as a splitters) are used to interface between the shared and dedicated portions of the access network (and also to multiplex multiple shared portions together). PON networks typically employ either Time Division Multiplexing (TDM) to share the fiber, as in BPON, EPON and GPON, or Wavelength Division Multiplexing (WDM) as in WDM-PON. Of these, WDM-PON has several advantages over TDM PONs. First, it offers significantly more data rate capacity, from 40-100 Giga-bits per second (Gbps) bidirectionally per PON, compared to 2.5-10 Gbps per PON for TDM PONs. The second is that logically, it operates as a collection of point to point links. This allows the ONT to be simpler, as it doesn't need to operate at the rate of the overall PON, just the rate of that point-to-point link.

Even with the advent of FTTH/B, FTTN/C architectures still remain attractive because of their significantly lower cost of deployment—particularly in areas where the physical infrastructure for telecommunications is already in place. Therefore, a way to economically provide the higher bandwidths offered by the FTTH WDM-PON architecture at the cost points of FTTC architectures is desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for communicating data in a communication network. In one exemplary embodiment, an arrayed media converter (AMC) has a plurality of Wavelength Division Multiplexing-Passive Optical Network (WDM-PON) Optical Network Units (ONUs) for terminating an optical channel. Each ONU converts an optical signal from the optical channel into at least one electrical signal for transmission to a customer premises. Thus, the AMC serves as an interface between at least one WDM-PON link and at least one conductive connection, such as a twisted pair composed of copper or other conductive material.

In one exemplary embodiment, the AMC comprises a sealed housing that is environmentally hardened to protect the AMC from environmental conditions, including changes in weather. Such an AMC may be used to provide a robust, cost effective FTTC solution, but the AMC may be used at other points within the network, if desired. As compared to other possible FTTC solutions, the AMC may offer various advantages, including but not limited to any combination of the following: low cost, low power, low latency, high bandwidth, and high scalability.

Figure 1:
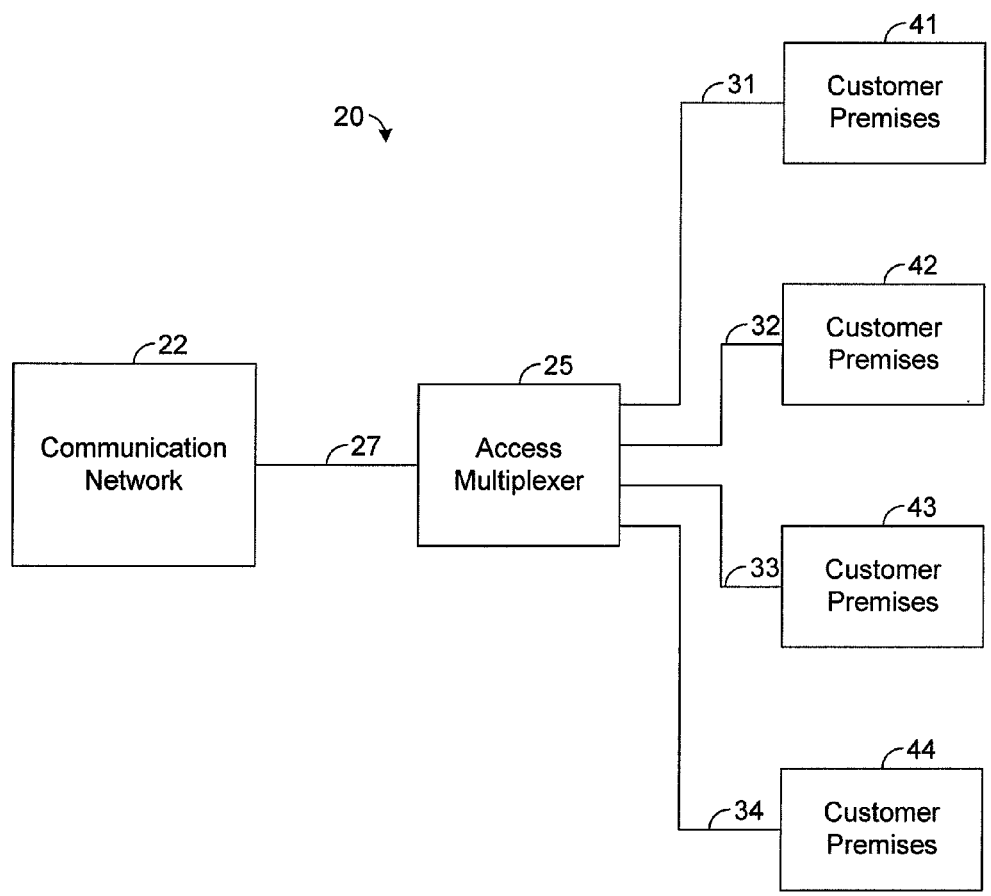
FIG. 1 is a block diagram illustrating an exemplary embodiment of a communication system.

FIG. 1 depicts an exemplary embodiment of a communication system 20 in accordance with the present disclosure. The system 20 comprises a communication network 22. The network 22 is coupled to an access multiplexer 25 via an optical fiber 27, which supports bidirectional transmission. The access multiplexer 25 demultiplexes an optical signal across multiple communication channels 31-34, each which supports bidirectional transmission, to a plurality of customer premises (CP) 41-44. Because each link is bidirectional, the access multiplexer 25 also multiplexes the signals from communications channels 31-34 to form the signal which is transmitted across the optical fiber 27 to the communication network 22. As an example, the access multiplexer 25 may form a fiber-fed Digital Subscriber Line Access unit (DSLAM), a broadband loop carrier, or a multi-service access node. Each of the channels 31-34 comprises at least one communication connection, such as a twisted pair, an optical fiber, or other communication medium for transmitting data. Note that the optical fiber 27 may actually employ two fibers to achieve bidirectional transmission, if desired.

At least one of the channels 31-34 comprises a conductive medium, such as a twisted pair. For any such conductive medium, the access unit 25 is configured to convert an optical signal from the optical fiber 27 into an electrical signal for transmission via the conductive medium to a customer premises, as will be described in more detail hereafter. The system 20 shown by FIG. 1 utilizes a FTTN/C architecture in that the access multiplexer 25 services multiple customer premises 41-44, such as multi-dwelling units (MDUs), single family units (SFUs), or other types of buildings or structures over drop media other than fiber. However, use of the access multiplexer 25 in other types of architectures is possible.

Figure 2:
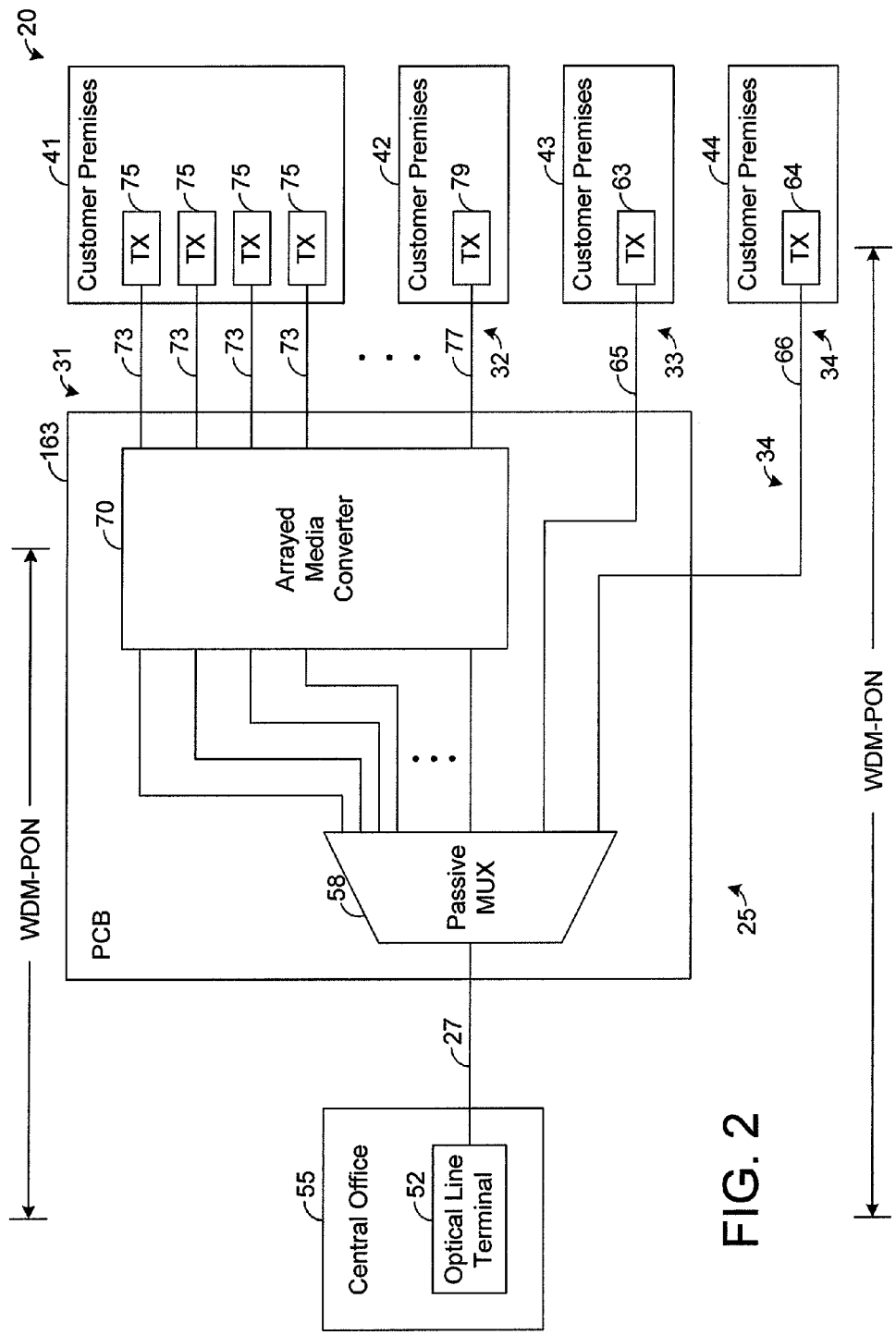
FIG. 2 is a block diagram illustrating an exemplary embodiment of the communication system depicted by FIG. 1

FIG. 2 depicts an exemplary embodiment of the communication system 20 depicted by FIG. 1. As shown by FIG. 2, one end of the optical fiber 27 is coupled to an optical line terminal (OLT) 52 residing at a central office 55 or other facility of the network 22. The other end of the optical fiber 27 is coupled to a passive multiplexer 58, such as an arrayed waveguide (AWG), of the access multiplexer (MUX) 25. The OLT 52 multiplexes a plurality of optical signals to provide a multiplexed optical signal and transmits the multiplexed optical signal via the optical fiber 27 to the passive multiplexer 58, which demultiplexes the multiplexed optical signal to separate the component optical signals originally multiplexed by the OLT 52. Some of the component optical signals can be transmitted to at least one customer premises bypassing the arrayed media converter 70. For example, in FIG. 2, component optical signals are received by optical transceivers 63, 64 at the customer premises 43, 44 via channels 33, 34. Each of the optical channels 33, 34 comprises at least one optical fiber 65, 66. In other embodiments, other numbers of component optical signals may be transmitted to other numbers of customer premises by the access multiplexer 25.

A portion of the component optical signals are converted to electrical signals via an arrayed media converter 70. In this regard, for each component optical signal received by the arrayed media converter 70 from the passive multiplexer 58, the arrayed media converter 70 converts the component optical signal into at least one electrical signal and transmits the electrical signal via at least one conductive connection, such as a twisted pair, to a customer premises. Since the data rate for an optical signal is likely higher than that for an electrical signal communicated via a conductive connection, it is likely to be desirable to convert a component optical signal into a plurality of electrical signals such that the aggregate data rate of the plurality of electrical signals is substantially equal to the data rate of the component optical signal.

In one exemplary embodiment, the components of the arrayed media converter 70 and the passive multiplexer 58 are housed by the same housing 170 (FIG. 3) and are integral with each other. However, other configurations are possible. For example, the arrayed media converter 70 may be housed by a housing 170, and the passive multiplexer 58 may be external to and separated from such housing 170.

In FIG. 2, a component optical signal from the passive multiplexer 58 is converted into a plurality of electrical signals that are respectively communicated via a plurality of conductive connections 73, such as copper twisted pairs, to transceivers 75 at a customer premises 41, such as a multi-dwelling unit or other type of customer premises. In one exemplary embodiment, each of the connections 73 is bundled in the same cable, but other configurations are possible. In one exemplary embodiment, the transceivers 75 communicate digital subscriber line (DSL) signals, such as very high bit rate Digital Subscriber Lines (VDSL) asymmetric Digital Subscriber Lines (ADSL), High-Bit-Rate Digital Subscriber line (HDSL), or other types of DSL signals. However, other types of communication protocols are possible. In FIG. 2, four connections 73 are shown extending from the access multiplexer 25 to the customer premises 41, but other numbers of connections 73 may be employed in other embodiments.

In addition, a component optical signal from the passive multiplexer 58 is converted into an electrical signal that is communicated via a conductive connection 77, such as a copper twisted pair, to a transceiver 79 at a customer premises 42, such as a single family unit or other type of customer premises. In one exemplary embodiment, the transceiver 79 communicates digital subscriber line (DSL) signals, such as ADSL, VDSL, or other types of DSL signals. However, other types of communication protocols are possible. In FIG. 2, one connection 77 is shown extending from the access multiplexer 25 to the customer premises 42, but other numbers of connections 77 may be employed in other embodiments.

In FIG. 2, the arrayed media converter 70 is shown as servicing two customer premises 41, 42. However, in other embodiments, the arrayed media converter 70 can be configured to service any number and/or type of customer premises.

Note that communication can occur in both directions. That is, data can also be communicated from the customer premises 41-44 to the communication network 22 (e.g., the central office 55 of FIG. 2). In this regard, each transceiver 75, 79 can transmit data to the arrayed media converter 70. In one exemplary embodiment, the communication occurring over each connection 73, 77 is bi-directional. However, it is possible for any of the connections 73, 77 to be dedicated for communication in only one direction.

In one exemplary embodiment, the arrayed media converter 70 receives electrical signals carrying data from the customer premises 41, 42 and converts the received electrical signals into optical signals, which are transmitted to the passive multiplexer 58. The passive multiplexer 58 receives an optical signal for each customer premises 41, 42 serviced by the arrayed media converter 70, although it is possible for the passive multiplexer 58 to receive other numbers of optical signals. As an example, the arrayed media converter 70 could convert electrical signals from multiple customer premises into a single optical signal for transmission to the passive multiplexer 58.

The passive multiplexer 58 multiplexes the plurality of optical signals received from the arrayed media converter 70 to provide a multiplexed optical signal that is transmitted to the optical line terminal 52 via the optical fiber 27. The optical line terminal 52 demultiplexes the multiplexed optical signal received from the access multiplexer 25 to recover the component optical signals originally multiplexed by the access multiplexer 25. The data from these component optical signals is then transmitted through the communication network 22 as appropriate.

In addition, the passive multiplexer 58 also receives data, if any, transmitted from the customer premises 43, 44 via the optical fibers 65, 66 that bypass the media converter 70. Like the communication occurring via the conductive connections 73, 77, the communication occurring via the optical fibers 65, 66 can be bi-directional. Alternatively, there could be additional optical fibers or other types of connections dedicated for either upstream or downstream communication.

In one exemplary embodiment, the optical link from the optical line terminal 52 to the arrayed media converter 70 is passive. In particular, the optical link from the central office to the arrayed media converter 70 is WDM-PON and has no active components, although the transceivers terminating such link have active components.

In addition, the links that bypass the arrayed media converter 70, such as the links from the multiplexer 58 to the customer premises 43, 44, are also passive. In particular, such links are WDM-PON and have no embedded active components, although the transceivers terminating such links have active components. Note that in other embodiments, any of the links shown by FIG. 2 may be of a type other than WDM-PON and may have active components, if desired.

Figure 3:
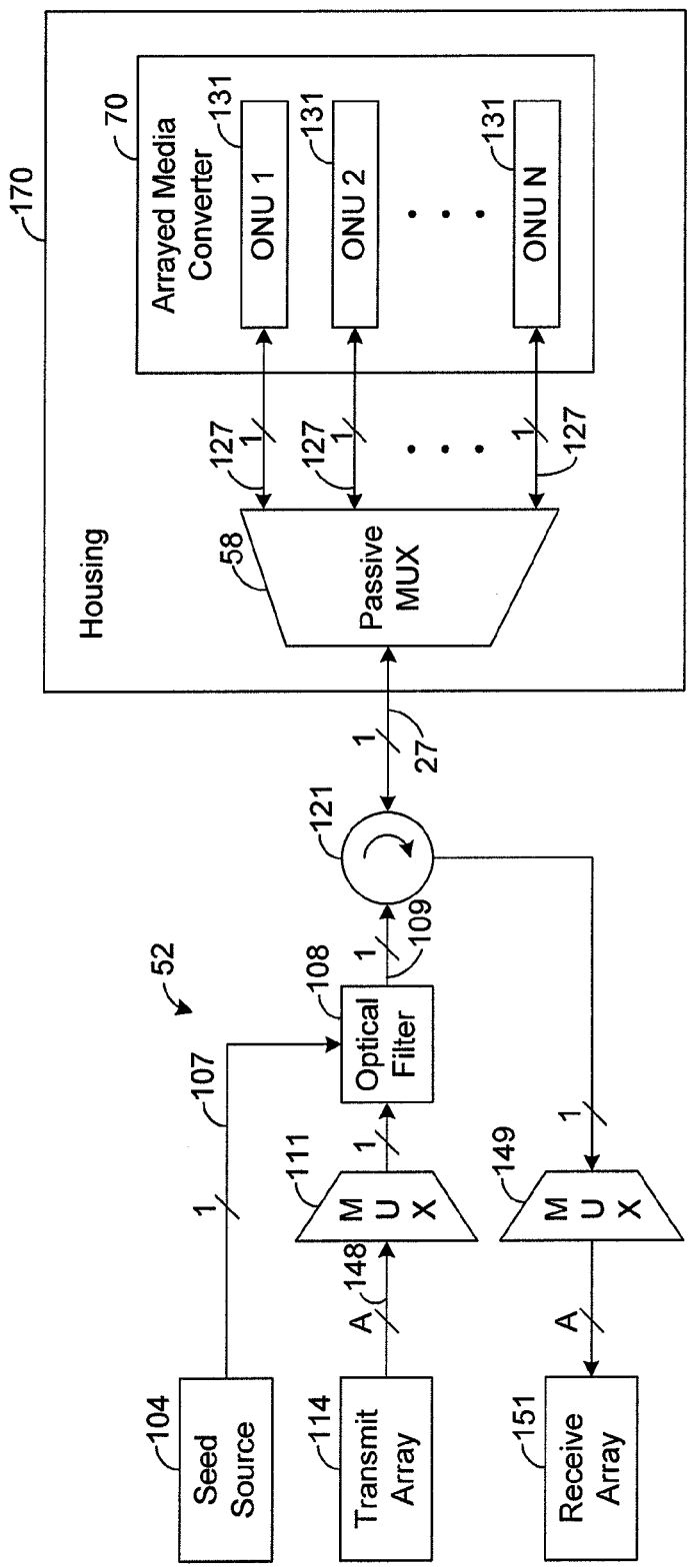
FIG. 3 is a block diagram illustrating an exemplary embodiment of an optical line terminal and an arrayed media converter depicted in FIG. 2.

FIG. 3 depicts an exemplary embodiment of the OLT 52 and arrayed media converter 70. In the exemplary embodiment shown by FIG. 3, the OLT 52 has a light source 104, referred to hereafter as "seed source," that transmits unmodulated broadband light via an optical fiber 107 to an optical filter 108, which inserts the seed light into an optical fiber 109 prior to a circulator 121 such that it propagates through the circulator 121 to the passive multiplexer 58. The multiplexer 58 has at least A channels, where A is an integer greater than 0. Each channel passes light only within a discrete wavelength range or band that does not overlap with the bands passed by the other channels. Thus, the multiplexer 58 effectively slices the broadband light into discrete optical signals, referred to hereafter as "seed signals." In the current embodiment, such seed signals are unmodulated.

In other embodiments, other techniques and configurations could be used to provide seed signals. For example, the seed source 104 could be configured to provide the seed signals by having a plurality of lasers with each laser configured to transmit light at a discrete wavelength. Also, the seed signals could be modulated. Various other techniques for providing seed signals to the arrayed media converter 70 are possible.

The OLT 52 also has a transmit array 114 comprising an array of optical transmitters (not specifically shown), such as lasers, coupled to the multiplexer 111 via A optical fibers 148. Each transmitter in the transmit array 114 receives data from the network 22 (FIG. 1) and modulates an optical signal with the received data. Thus, the transmit array 114 transmits A number of optical signals that have been modulated with data. As used herein, the term "data signal" shall refer to any signal that has been modulated with data.

Each data signal transmitted by the transmit array 114 is at a discrete wavelength that is different than the wavelengths of the other data signals transmitted by the array 114. In addition, each data signal is received by a respective channel of a multiplexer 111. The multiplexer 111 multiplexes the received optical signals from the transmit array 114 to provide a multiplexed optical signal that is transmitted through the optical filter 108 and circulator 121 to the optical fiber 27. The multiplexer 111, like the multiplexer 58, has at least A channels, and each channel passes light only within a discrete wavelength range that does not overlap with the bands passed by the other channels.

The multiplexer 58 demultiplexes the multiplexed signal received from the optical fiber 27 to recover the component optical signals originally multiplexed by the multiplexer 111. As described above, at least some of the component optical signals are received by the arrayed media converter 70, and it is possible for one or more of the component optical signals to bypass the arrayed media converter 70 such that the arrayed media converter 70 receives N number of component optical signals, where N is any integer above 1 and equal to or less than A. Recovered data signals and seed signals are transmitted via N number of optical fibers 127 to an array of optical network units (ONUs) 131 of the arrayed media converter 70. The arrayed media converter 70 has at least N number of ONUs 131 such that each optical data signal received by the arrayed media converter 70 from the transmit array 114 is received by a respective ONU 131. That is, each ONU 131 receives one optical data signal. In addition to receiving a respective data signal from the multiplexer 58, each ONU 131 also receives a respective seed signal.

Figure 4:
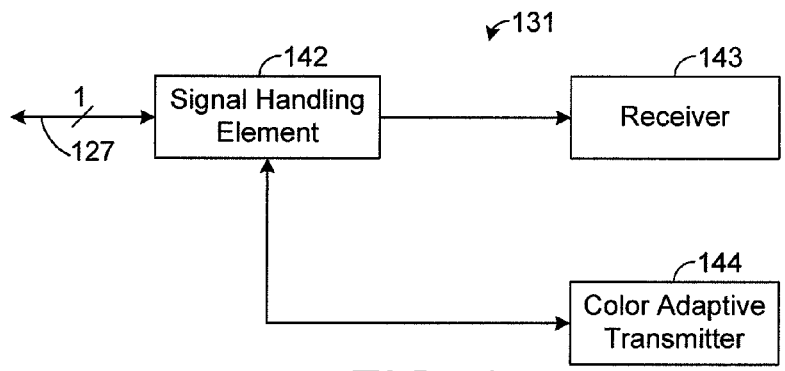
FIG. 4 is a block diagram illustrating an exemplary embodiment of an optical network unit, such as is depicted in FIG. 3.

FIG. 4 depicts an exemplary embodiment of an ONU 131. The exemplary ONU 131 depicted by FIG. 4 has a signal handling element 142, an optical receiver 143, and an optical transmitter 144. The signal handling element 142 directs the data signal from the multiplexer 58 to the receiver 143, which demodulates the data signal to recover the data carried by such signal. This data is then transmitted to at least one customer premises via at least one electrical signal, as will be described in more detail hereafter.

The optical transmitter 144 receives data that has been transmitted from at least one customer premises transceiver 75 (FIG. 2) and modulates an optical signal with this data. The transmitter 144 transmits the modulated optical signal or data signal to the signal handling element 142, which inserts the data signal onto the optical fiber 127 such that the data signal is transmitted via the optical fiber 127 to the multiplexer 58. The multiplexer 58 receives a data signal from each ONU 131, and each such optical data signal has a discrete wavelength that is different than the wavelengths of the other optical data signals transmitted by the other ONUs 131. The multiplexer 58 multiplexes the data signals from the ONUs 131 to provide a multiplexed optical signal that is transmitted to the OLT 52 via the optical fiber 27.

As previously described above, there are various techniques and configurations that may be used to provide optical data signals and seed signals to the arrayed media converter 70. In the embodiments for which unmodulated seed signals are provided to the arrayed media converter 70, the signal handling element 142 may comprise an optical filter for performing the functionality described above for the element 142. However, the signal handling element 142 may comprise other components in other embodiments. For example, in one exemplary embodiment, the optical data signals from the transmit array 114 are used to provide the seed signals. In such an example, the signal handling element 142 may comprise a splitter that splits an optical data signal such that some light from the optical data signal is received by both the receiver 143 and the transmitter 144. In such an embodiment, the seed source 104 is unnecessary. Other configurations of the signal handling element 142 are possible in other embodiments.

Each ONU 131 may comprise a tunable laser for transmitting an optical data signal at a desired wavelength to the OLT 52 (FIG. 2). However, many conventional tunable lasers are expensive and are sensitive to temperature variations.

In one exemplary embodiment, the optical transmitter 144 of the exemplary ONU 131 shown by FIG. 4 is color adaptive. In this regard, the element 142 directs the seed signal received from the multiplexer 58 via fiber 127 to the transmitter 144, which is configured to transmit based on the seed signal. In this regard, the transmitter 144 uses the seed signal to transmit an optical data signal to the OLT 52 (FIG. 3) at the wavelength of the seed signal. Thus, the transmitter 144 effectively locks onto the wavelength of the seed signal. Such color adaptive transmitters can be less expensive than many tunable lasers primarily because they do not require active wavelength tuning and associated temperature control. If desired, each ONU 131 of the arrayed media converter 70 may comprise a color adaptive transmitter 144, as shown by FIG. 4.

Various types of known color adaptive transmitters can be used to implement the transmitter 144 shown by FIG. 4. In one exemplary embodiment, the transmitter 144 comprises a reflective semiconductor amplifier (RSOA), which amplifies, modulates, and reflects the seed signal. In another exemplary embodiment, the transmitter 144 comprises an injection locked Fabry Perot (IL-FP) laser, which is forced by the seed signal to resonate at the frequency of the seed signal. The presence of the seed signal in the RSOA or IL-FP laser causes the transmitter 144 to transmit at the wavelength of the seed signal being received. Thus, if the wavelength of the seed signal fluctuates, the wavelength of the optical data signal transmitted by the transmitter 144 similarly fluctuates (provided the seed signal corresponds to and is therefore passed by a channel in the multiplexors 111 and 58). Various other types of known optical transmitters may be used in other embodiments.

Referring to FIG. 3, the multiplexed optical signal transmitted from the passive multiplexer 58 passes through the circulator 121 and is received by a passive multiplexer 149, which demultiplexes the multiplexed optical signal thereby separating such signal into the optical data signals originally multiplexed by the multiplexer 58. Such data signals are received by optical receivers (not specifically shown) within a receive array 151. In this regard, each of the optical receivers receives a respective data signal and demodulates the data signal to recover the data carried by such signal. The data is then transmitted through the network 22. It should be emphasized that the exemplary configurations of the optical line terminal 52 are presented herein for illustrative purposes to facilitate a better understanding of the disclosure. In other embodiments, other configurations of the optical line terminal 52 are possible.

Figure 5:
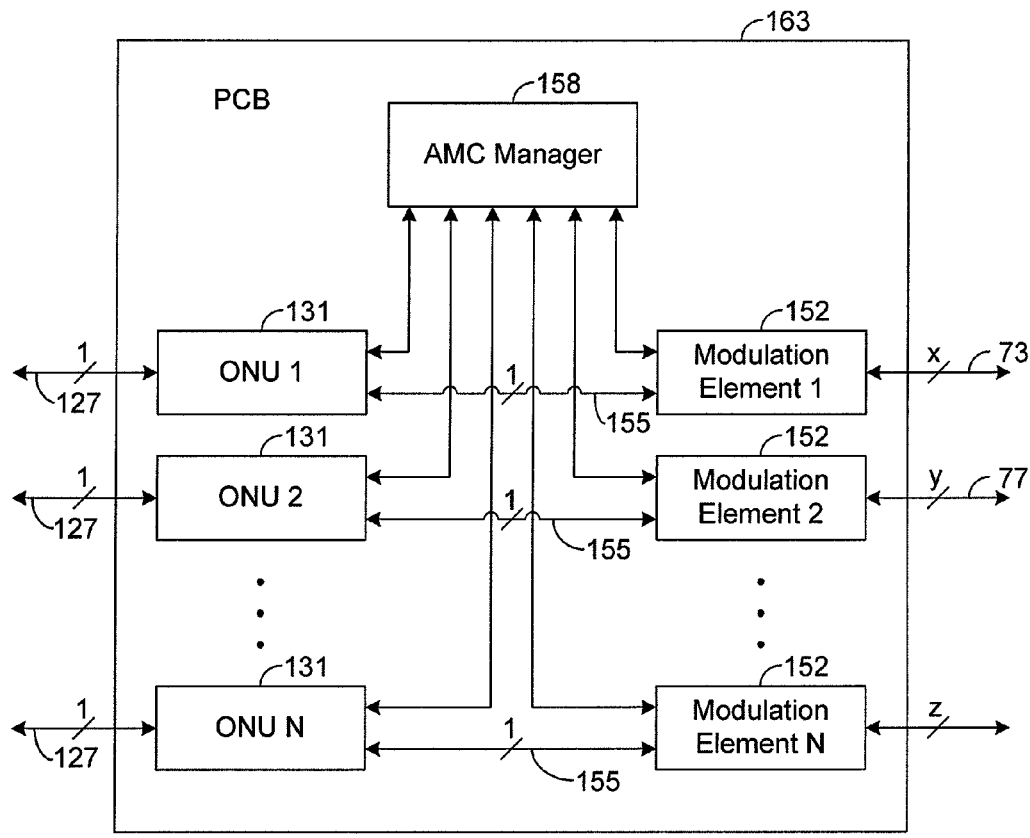
FIG. 5 is a block diagram illustrating an exemplary embodiment of the arrayed media converter depicted in FIG. 3.

FIG. 5 depicts an exemplary embodiment of the arrayed media converter 70. As shown by FIG. 5, the ONUs 131 are respectively coupled to a plurality of modulation elements 152 via conductive connections 155. Moreover, each of the shown data paths through the arrayed media converter 70 has a modulation element 152 in series with an ONU 131. The modulation element 152 receives an electrical signal from at least one conductive connection and demodulates the electrical signal to recover data carried by such signal. The modulation element 152 is configured to multiplex, if necessary, and then transmit the recovered data to the ONU 131 that is coupled to it via a conductive connection 155. Such ONU 131 is configured to use the data to modulate an optical signal and to transmit the optical signal to the multiplexer 58 as described above.

For example, in the exemplary embodiment shown by FIG. 5, one of the modulation elements 152 (i.e., "Modulation Element 1") is configured to receive a plurality of electrical signals from the conductive connections 73. Such modulation element 152 demodulates these electrical signals to recover data and transmits this data to the "ONU 1." In one exemplary embodiment, a color adaptive transmitter 144 (FIG. 4) of the "ONU 1" transmits an optical data signal that is based on an optical seed signal received from the OLT 52. In particular, the optical data signal is locked to the same wavelength as the optical seed signal. The optical data signal defines the data recovered by the "Modulation Element 1" and, therefore, the data originally transmitted from the customer premises 41 via the transceivers 75 (FIG. 2). Moreover, the arrayed media converter 70 converts a plurality of electrical data signals from the customer premises 41 into an optical data signal that is transmitted to the OLT 52. The arrayed media converter 70 may similarly convert the electrical data signals from other customer premises into optical data signals.

In addition, as described above, each ONU 131 receives a respective optical data signal from the multiplexer 58. The receiver 143 (FIG. 4) of the ONU 131 demodulates the received optical data signal to recover the data carried by such signal. The receiver 143 also transmits the recovered data to the modulation element 152 that is coupled to it via a conductive connection 155. The modulation element 152 then modulates at least one electrical signal with the foregoing data and transmits the modulated electrical signal to a remote transceiver, such as a transceiver at a customer premises.

For example, in the exemplary embodiment shown by FIG. 5, one of the modulation elements 152 (i.e., "Modulation Element 1") is coupled to a plurality of conductive connections 73 servicing the customer premises 41. In such an example, the "Modulation Element 1" modulates a plurality of electrical signals with data recovered and demultiplexed from an optical data signal received by the "ONU 1," and the "Modulation Element 1" transmits each such electrical signal via a respective connection 73. Therefore, the aggregate data rate of the plurality of signals may be substantially equal to the data rate of the optical data signal even though the individual data rate of any one of the electrical signals is significantly less than the data rate of the optical data signal. Moreover, the arrayed media converter 70 converts the optical data signal from the OLT 52 for the customer premises 41 into a plurality of electrical data signals that are transmitted to the transceivers 75. The arrayed media converter 70 may similarly convert the optical data signals for other customer premises into electrical data signals.

As shown by FIG. 5, the arrayed media converter 70 comprises a manager 158, referred to as the "arrayed media converter (AMC) manager," that is configured to manage the other components of the arrayed media converter 70. The AMC manager 158 is configured to control the operation and/or configuration of the ONUs 131 and/or the modulation elements 152. As a mere example, the AMC manager 158 may be configured to set priority of traffic processed by the ONUs 131 and modulation elements 152. In this regard, the AMC manager 158 for any data path through the arrayed media converter 70 may configure the ONU 131 of such data path to prioritize voice traffic over data traffic in order to reduce latencies in the voice communication serviced by the data path. In another example, the AMC manager 158 may be configured to set limits on the data rates enabled by the ONUs 131. In yet another example, the AMC manager 158 may be configured to selectively enable the ONUs 131. For example, if a customer stops paying for service or terminates service, the AMC manager 158 may be configured to disable the ONU 131 that is servicing such customer such that the customer can no longer utilize the arrayed media converter 70 for data communication. Various other types of management functions are possible for the AMC manager 158.

In one exemplary embodiment, the AMC manager 158 receives control data from a service provider and controls the ONUs 31 and/or the modulation elements 152 based on such control data. In this regard the arrayed media converter 70 may have a data port (not shown) to allow a technician to interface equipment for downloading the control data to the AMC manager 158. In one exemplary embodiment, the arrayed media converter 70 is configured to receive the control data from a remote location so that it is unnecessary for a technician to travel to the AMC 70 in order to change the configuration or operation of the arrayed media converter 70. In this regard, the control data can be embedded in a data stream transmitted to the arrayed media converter 70 from the network 22. There are various techniques known in the art for embedding control data in a data channel.

For example, for packet-based communication, each data packet has a header portion and a data portion. Information in the header portion may indicate whether the packet contains control data. Thus, to transmit control data to the arrayed media converter 70, the control data may be inserted into a data packet and the packet's header may be controlled to indicate the presence of control data in the packet. When an ONU 131 of the arrayed media converter 70 receives such a data packet, sometimes referred to as a "control packet," the ONU 131 identifies the packet as being a control packet based on its header. The ONU 131 then extracts the control data from the packet and provides it to the AMC manager 158, which then controls the arrayed media converter 70 in accordance with the control data. In another example, a control channel and a data channel may exist at different wavelengths on the same fiber 27. In another example, the control data can be used to modulate the optical carrier at frequencies less than frequency range for the data of the data channel. Filtering may then be used by the receiving ONU 131 after the received signal has been converted to an electrical signal to separate the control data of the control channel from the data of the data channel. In yet another example, a dedicated telecommunication line, such as an optical fiber or twisted pair, may be used to transmit control data from the network 22 to the arrayed media converter 70. There are various other techniques that may be used to transmit control data from a remote location to the arrayed media converter 70.

As shown by FIG. 5, all of the components of the arrayed media converter 70, including all of the ONUs 131, the modulation elements 152, and the AMC manager 158, reside on a single printed circuit board 163 in one exemplary embodiment. However, in other embodiments, other configurations are possible. For example, it is possible for the components to reside on multiple PCBs. Further, in one exemplary embodiment, the passive multiplexer 58 also resides on the PCB 163, as shown by FIG. 2, but other configurations are possible in other embodiments.

Note that the access multiplexer 25 may be exposed to weather and/or relatively harsh environmental conditions. For example, in a FTTC architecture, the access multiplexer 25 may be mounted on a telephone pole or otherwise positioned outdoors. In one exemplary embodiment, the components of the access multiplexer 25, such as the passive multiplexer 58 and the arrayed media converter 70 shown by FIG. 2, are housed in an environmentally hardened housing 170.

Figure 6:
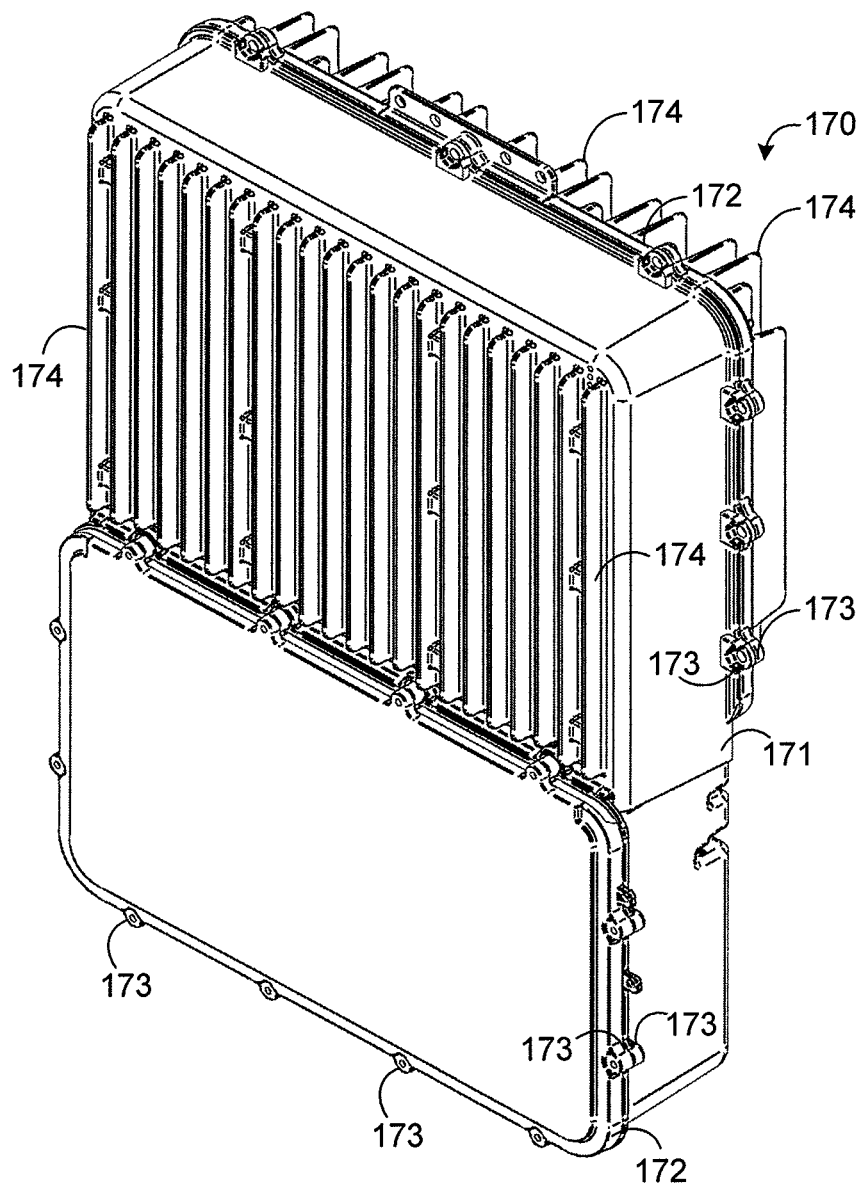
FIG. 6 depicts an exemplary embodiment of a housing that is used to house an arrayed media converter, such as is depicted in FIG. 5.

FIG. 6 shows an exemplary embodiment of a sealed housing 170 that may be used to house the components of the access multiplexer 25 and to protect such components from the environment. In one exemplary embodiment, the housing 170 is sealed such that it is watertight. In addition, the housing 170 is composed of a thermally conductive material, such as aluminum, in order to provide better heat sinking characteristics. In this regard, the PCB 163 and/or integrated circuit (IC) chips residing on the PCB 163 may contact the housing 170 at one or more points to allow heat from the PCB 163 to quickly dissipate to the surrounding environment through the housing material.

In the embodiment shown by FIG. 6, the housing 170 has a hollow base 171 in which components of the access multiplexer 25 reside. Removable panels 172 are detachably coupled to the base 171, and access to the arrayed media converter 70 and/or other components of the access multiplexer 25 may be achieved by removing at least one of the panels 172. In one exemplary embodiment, the panels 172 and the base 171 have aligned receptacles 173 for receiving screws (not shown) or other types of couplers in order to secure the panels 172 to the base 171. In addition, each removable panel 172 contacts a gasket composed of rubber or some other material to help form a watertight seal around the periphery of the panel 172. As shown by FIG. 6, the housing 170 has ribs 174, which increase the surface area of the housing 170 exposed to the surrounding environment to enhance the heat sinking characteristics of the housing 170. The housing 170 shown by FIG. 6 is exemplary, and other types of housings can be used in other embodiments.

If desired, the arrayed media converter 70 may comprise at least one temperature control element (not shown), such as a heating element or a cooling element, for controlling temperature within the housing 170. In such an embodiment, the arrayed media converter 70 comprises a temperature sensor (not shown) in communication with the AMC manager 158. If the measured temperature falls below a specified threshold, then the AMC manager 158 is configured to activate a heating element to heat the air and/or components within the housing 170. Once the measured temperature rises above a specified threshold, the AMC manager 158 is configured to deactivate the heating element. Such a heating element may be positioned anywhere in the arrayed media converter 70, but it may be particularly desirable to have a heating element positioned close to the ONU lasers, which may be more susceptible to temperature fluctuations than other components of the arrayed media converter 70. In one exemplary embodiment, the heating element is a resistive component that emits heat when electrical current is passed through it. Other types of heating elements may be employed, if desired.

It is also possible for the arrayed media converter 70 to have a cooling element, such as a fan, for cooling and/or circulating air. If a temperature measured by temperature sensor exceeds a specified threshold, then the AMC manager 158 is configured to activate the cooling element. Once the measured temperature falls below a specified threshold, the AMC manager 158 is configured to deactivate the cooling element. However, it should be emphasized that the use of temperature control elements, as described above, is optional.

As described above, the link from the OLT 52 to the arrayed media converter 70 is passive. However, the ONUs 131, the modulation elements 152, and the AMC manager 158 have active components that require electrical power for operation. Such components may draw electrical power from various sources. For example, the access multiplexer 25 may have a power source (not shown), such as battery, for providing electrical power to the active components of the arrayed media converter 70. However, a battery must be replaced from time-to-time increasing the burden of maintaining the access multiplexer 25.

In one exemplary embodiment, electrical power is drawn from the conductive connections 73, 77 that are coupled to the arrayed access multiplexer 70. For example the transceivers 75, 79 at each customer premises 41, 42 serviced by the arrayed media converter 70 may be configured to provide a direct current (DC) signal across at least one conductive connection 73, 77. Techniques for providing DC signals across conductive connections, such as twisted pairs, in order to provide power to remote components are generally well-known.

Figure 7:
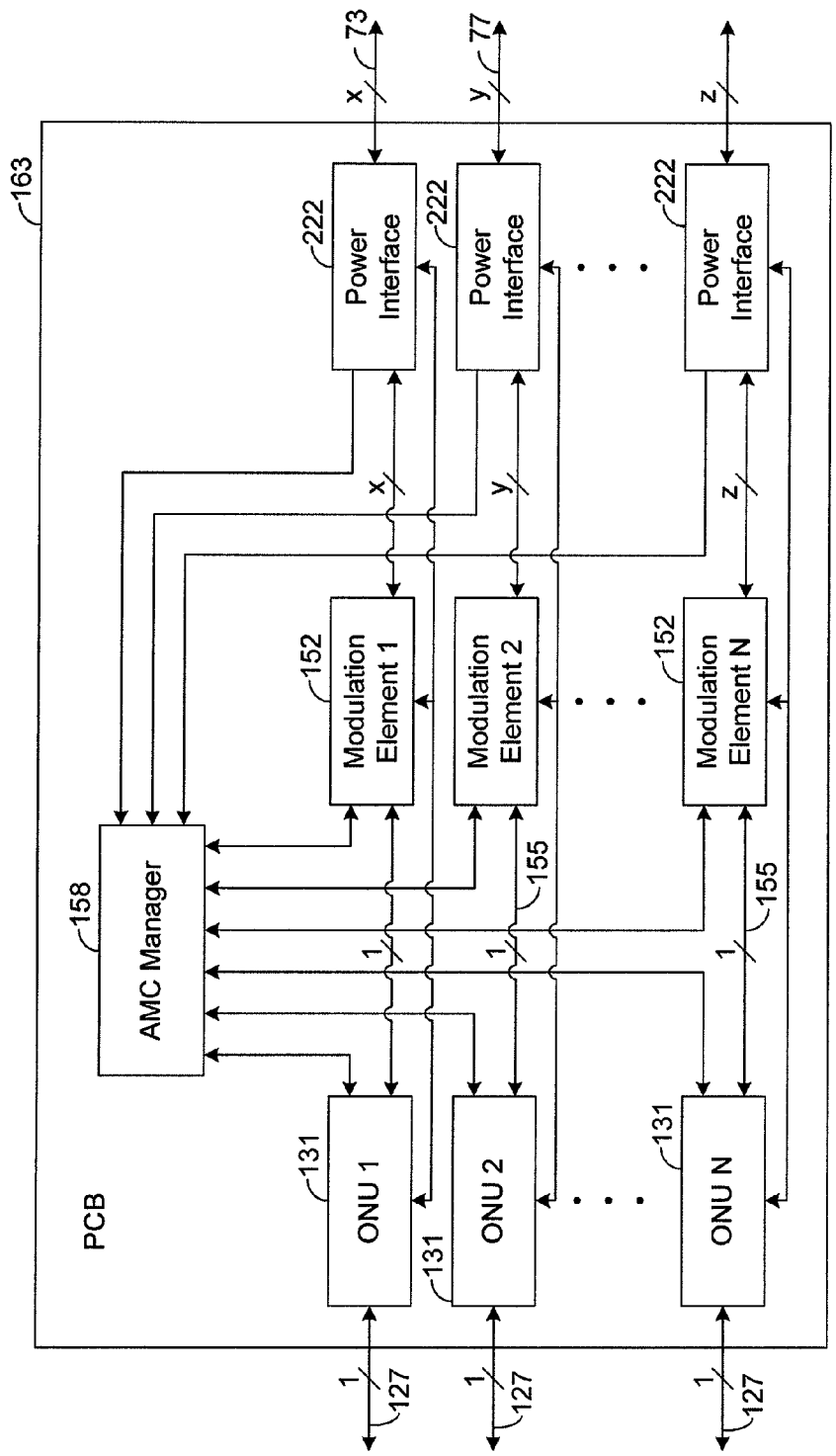
FIG. 7 is a block diagram illustrating an exemplary embodiment of the arrayed media converter depicted in FIG. 3.

As shown by FIG. 7, the arrayed media converter 70 comprises a plurality of power interfaces (Pis) 222 that are respectively in series with the modulation elements 152. Each power interface 222 is configured to draw power from at least one conductive connection and to provide power to other components of the arrayed media converter 70. In one exemplary embodiment, the power drawn from a particular customer is used to power only the components that service that customer, except for the AMC manager 158, as will be described in more detail hereafter.

For example, in FIG. 7, the "ONU 1" and the "Modulation Element 1" in series with the "ONU 1" service the customer premises 41. The transceivers 75 at the customer premises 41 provide power to at least one of the conductive connections 73, and the power interface 222 coupled to the conductive connections 73 draws this power from at least one of the connections 73. The power interface 222 provides this power to the aforementioned "ONU 1" and the "Modulation Element 1" servicing the customer premises 41. However, the foregoing power is not provided to the other ONUs 131 and the other modulation elements 152, which service the other customer premises, such as customer premises 42. Further, the other power interfaces 222 are similarly configured such that power drawn from any customer premises is not used to power components for servicing other customer premises, except as will be described below for the AMC manager 158. Accordingly, except as otherwise described herein, each customer is responsible for only powering the ONU 131 and the modulation element 152 servicing his premises and, therefore, does not incur additional costs for powering the other ONUs 131 and modulation elements 152. Thus, the power drawn from a customer premises is closely related to the power that is required to service such customer premises.

In one exemplary embodiment, each power interface 222 is configured to provide power to the AMC manager 158. Thus, the AMC manager 158 uses a small amount of power from each customer premises such that the burden of powering the AMC manager 158 is spread across all of the customers being serviced by the arrayed media converter 70. However, other configurations are possible in other embodiments.

There are various techniques that can be used to split the powering of the AMC manager 158 across multiple customers. In one exemplary embodiment, the AMC manager 158 is configured to draw a substantially equal amount of power from each power interface 222 that is providing power to the AMC manager 158. Therefore, each customer being serviced by the arrayed media converter 70 at any given time is sharing approximately equally in the burden of powering the AMC manager 158. That is, at any given instant, each customer being serviced is providing about the same amount of power to the AMC manager 158 relative to other customers. Various other techniques for splitting the power burden associated with the AMC manager 158 across multiple customers are possible.

Figure 8:
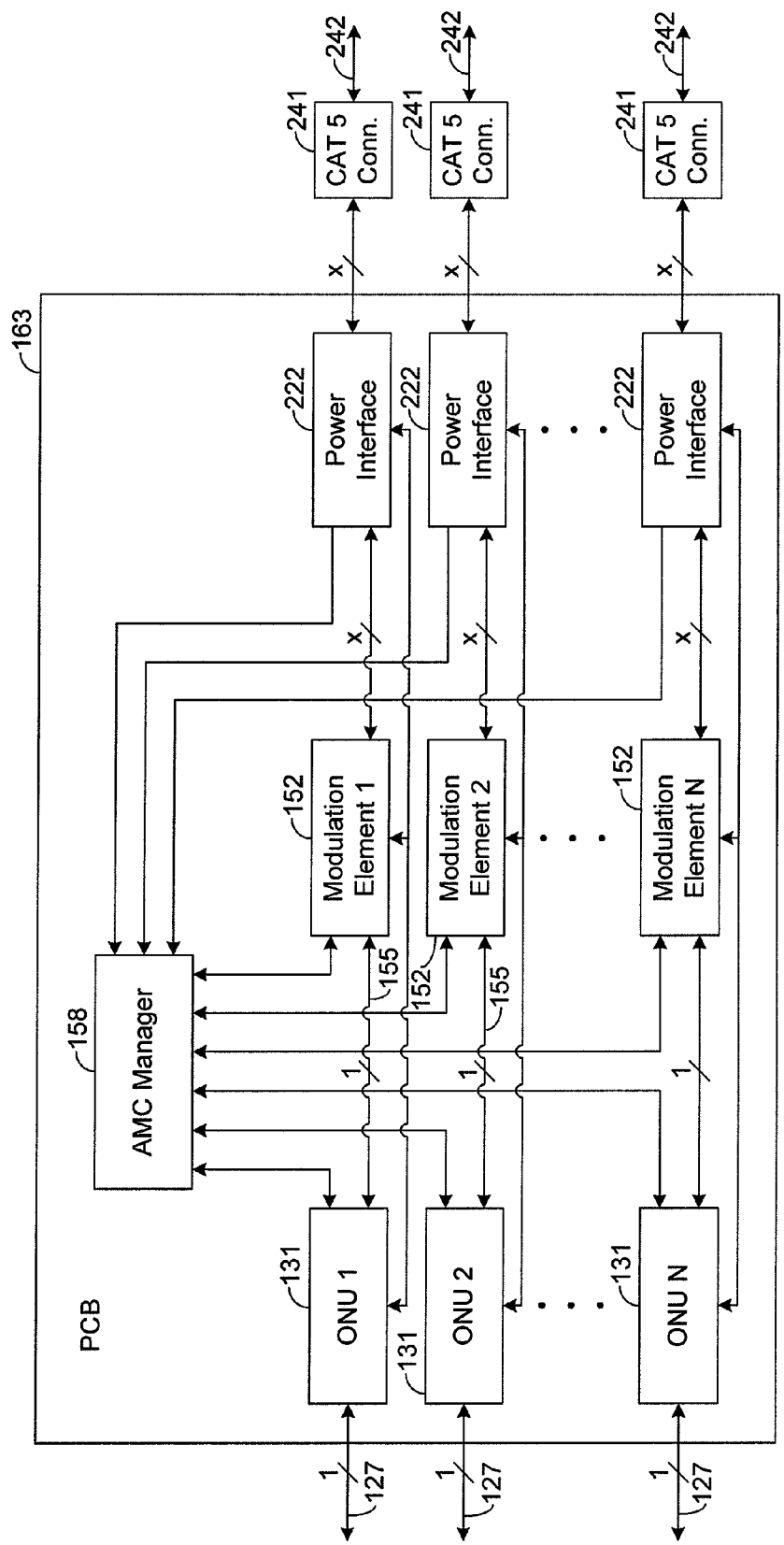
FIG. 8 is a block diagram illustrating an exemplary embodiment of the arrayed media converter depicted in FIG. 3.

As described above, various types of conductive connections may be interfaced with the arrayed media converter 70. In one exemplary embodiment, Ethernet cables are used to interface the arrayed media converter 70 with at least one customer premises. For example, FIG. 8 shows an exemplary embodiment in which the arrayed media converter 70 comprises a category (CAT) 5 connecter 241 in series with the "ONU 1." In such an embodiment, a CAT 5 cable 242 having a plurality of conductive connections may be interfaced with the connector 241 and carry the electrical signals transmitted to and from the customer premises 41. Thus, such electrical signals may be communicated in accordance with protocols defined in I.E.E.E. 802.3z, although other protocols may be utilized, if desired. In addition, other types of Ethernet or non-Ethernet connectors may be used in other embodiments.

Figure 9:
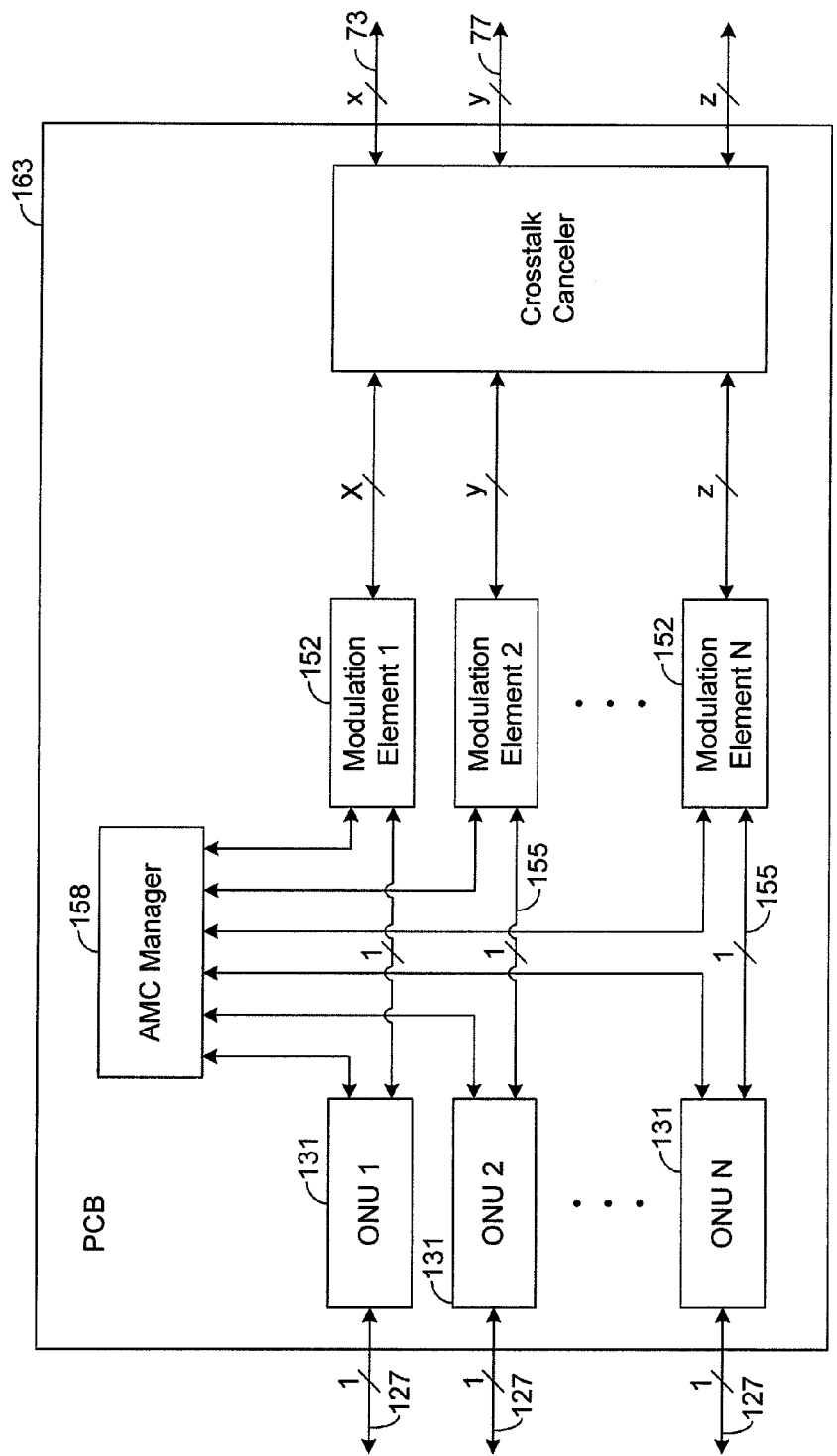
FIG. 9 is a block diagram illustrating an exemplary embodiment of the arrayed media converter depicted in FIG. 3.

In one exemplary embodiment, the arrayed media converter 70 comprises a crosstalk canceler 252, as shown by FIG. 9. The crosstalk canceler 252 may be implemented in hardware, software, firmware, or any combination thereof. In one exemplary embodiment, the crosstalk canceler 252 comprises a digital signal processor (DSP) (not shown) that is configured to receive and process the electrical signals transmitted from the customer premises 41, 42 and/or pre-compensate the electrical signals from all of the ONUs 131 on the arrayed media converter 70 before transmission to customer premises 41, 42. However, other configurations of the crosstalk canceler 252 are possible.

The crosstalk canceler 252 is configured to estimate crosstalk interference affecting at least one electrical signal and to cancel the estimated crosstalk interference. For example, assume that a first electrical signal transmitted across one of the conductive connections 73 induces crosstalk interference for a second electrical signal transmitted across another of the conductive connections 73. The crosstalk canceler 252 receives both signals and based on the first electrical signal estimates an amount of crosstalk interference in the second signal. The crosstalk canceler 252 then cancels the estimated crosstalk interference in the second electrical signal before transmitting the second electrical signal to a modulation element 152. In one exemplary embodiment, the crosstalk estimate is based on a plurality of electrical signals, such as all of the electrical signals that induce crosstalk interference in the second electrical signal. Thus, the crosstalk estimate represents an estimate of the total amount of crosstalk interference affecting the second electrical signal such that the second electrical signal, when transmitted from the crosstalk canceler 252, is substantially free of crosstalk interference.

In another embodiment, the crosstalk canceler 252 can pre-compensate electrical signals from the plurality of ONUs 131 of the arrayed media converter 70, prior to transmission across conductive connections 73, based on a crosstalk estimate of a plurality of electrical signals, so that when the transmitted signals arrive at the customer premises 41, 44, they are substantially free from crosstalk. If desired, both receiver-side crosstalk cancellation and pre-compensation can be performed simultaneously in the crosstalk canceler 252. U.S. patent application Ser. No. 12/036,855, entitled "Systems and Methods for Canceling Crosstalk from Digital Multi-Tone (DMT) Signals," and filed on Feb. 25, 2008, which is incorporated herein by reference, describes exemplary embodiments of crosstalk cancellers that may be used to implement the canceler 252.

Figure 10:
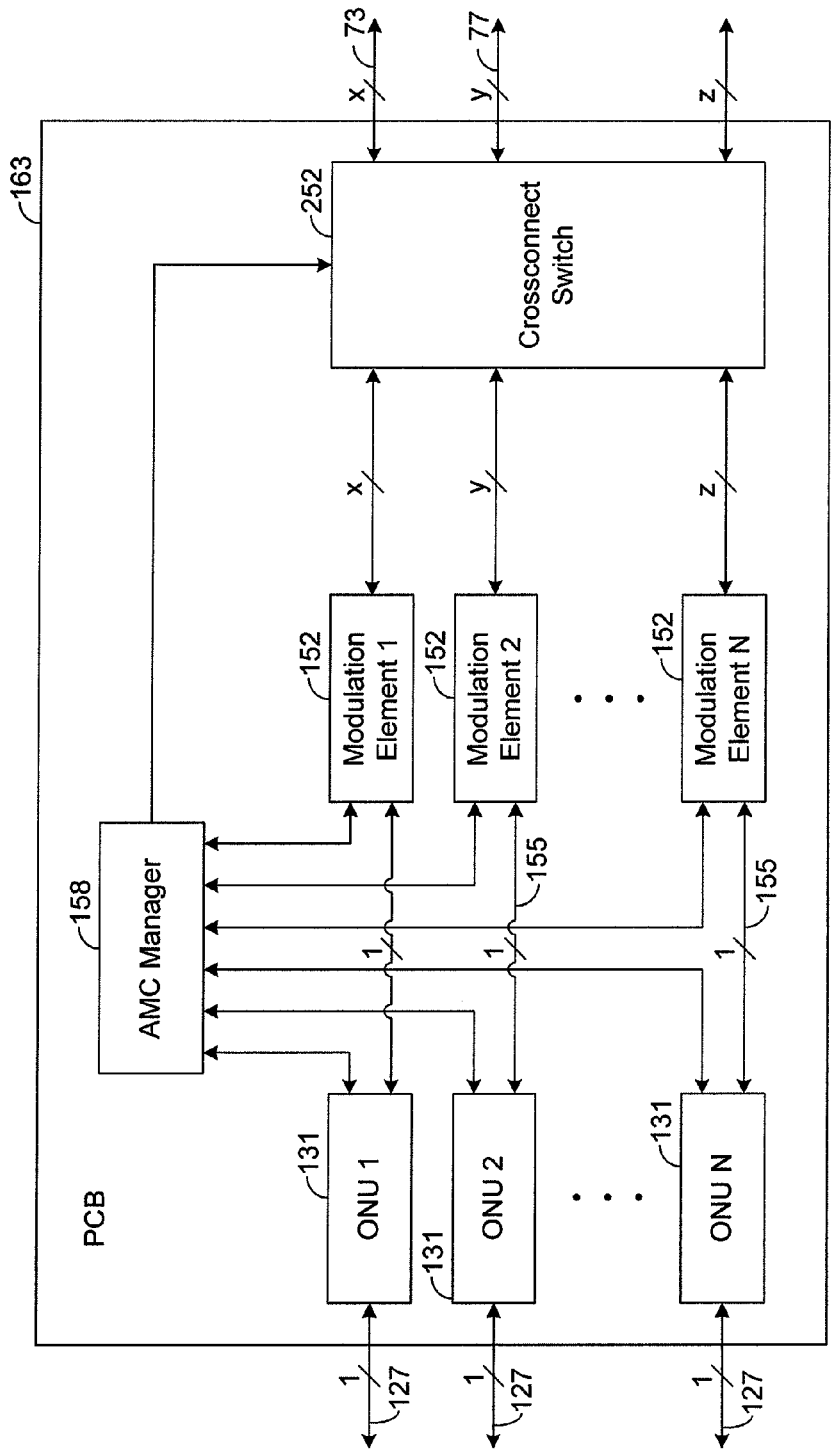
FIG. 10 is a block diagram illustrating an exemplary embodiment of the arrayed media converter depicted in FIG. 3.

In one exemplary embodiment, the arrayed media converter 70 comprises a cross-connect switch 252, as shown by FIG. 10. The cross-connect switch 252 enables any of the connections 73, 77 to be connected to any of the modulation elements 152. Further, the cross-connect switch 252 is coupled to the AMC manager 158, and the AMC manager 158 is configured to dynamically control the switching performed by the switch 252. For example, in response to control data from a remote service provider, the AMC manager 158 may change to which modulation element 152 a connection 73, 77 or set of connections 73, 77 are coupled.

As a mere example, assume that the connections 73 from customer premises 41 are coupled to a modulation element 152 that is configured to modulate and demodulate in accordance with a first protocol. Further, assume that the customer upgrades his service such that a different modulation protocol is to be used to service the customer. In such an example, the AMC manager 158 may receive instructions to change the customer's service to a new modulation element 152. Accordingly, the AMC manager 158 controls the cross-connect switch 252 such that the connections 73 are coupled to the new modulation element 152 thereby changing which of the modulation elements 152 services the customer.

In another example, assume that one of the modulation elements 152 experiences an operational problem. In such an example, the AMC manager 158 may detect the operational problem and automatically control the switch 252 such that the connections 73, 77 coupled to the problematic modulation element 152 are instead coupled to another modulation element 152, which is operational. In other examples, the connections 73, 77 may be switched among the modulation elements 152 by the cross-connect switch 252 via other techniques and for other reasons.

In one exemplary embodiment, the cross-connect switch 252 is implemented as a matrix of hardware switches. However, other configurations are possible. The cross-connect switch 252 could be implemented in hardware, software, firmware, or any combination thereof.

An exemplary use and operation of the system 20 will now be described with particular reference to FIGS. 11 and 12.

Referring to FIG. 3, the seed source 104 transmits seed light to the filter 108, which inserts the seed light onto the optical fiber 109. Each transmitter of the transmit array 114 transmits an optical data signal at a discrete wavelength to the multiplexer 111. Each respective channel of the multiplexer 111 passes a respective one of the optical data signals from the transmit array 114. The multiplexer 111 multiplexes the optical data signals to form a multiplexed optical signal, which is transmitted via the optical fiber 27 along with the seed light from the source 104.

Figure 11:
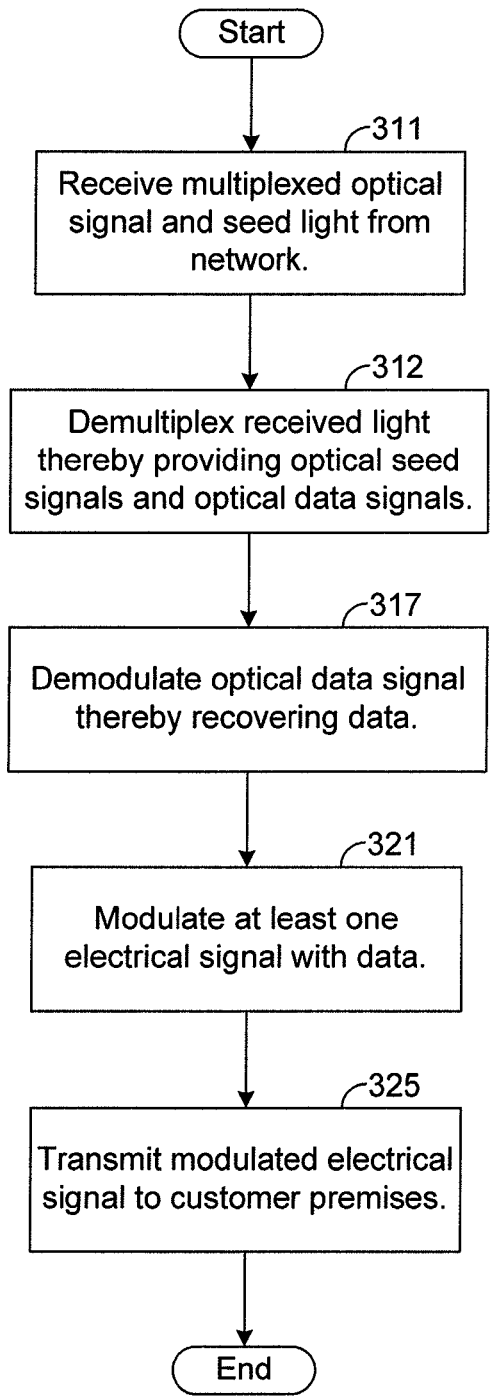
FIG. 11 is a flowchart illustrating an exemplary method for using the arrayed media converter depicted by FIG. 3 to transmit data from a network to at least one customer premises.

The passive multiplexer 58 receives and demultiplexes the multiplexed optical signal to separate the multiplexed optical signal into the optical data signals originally multiplexed by the multiplexer 111, as shown by blocks 311, 312 of FIG. 11. The multiplexer 111 also slices the seed light thereby providing discrete seed signals. Each ONU 131 of the arrayed media converter 70 receives a respective one of the optical seed signals and a respective one of the optical data signals. In one exemplary embodiment where an AWG is used as the passive multiplexer 58, the optical seed signal and the optical data signal received by the same ONU 131 have wavelengths separated by the free spectral range of the passive multiplexer 58 such that they pass through the same channel of the passive multiplexer 58. Alternatively, the data signal may be used as both the data carrier and as the seed signal to lock the ONU 131 transmitter.

Each ONU 131 demodulates the optical data signal received from the passive multiplexer 58 thereby recovering data, as shown by block 317 of FIG. 11. The data recovered by a respective ONU 131 is transmitted to a modulation element 152 (FIG. 5), which modulates at least one electrical signal with the data, as shown by block 321 of FIG. 11. Each such electrical signal is then transmitted to at least one customer premises, as shown by block 325 of FIG. 11.

In one exemplary embodiment, each electrical signal modulated with data from the same optical data signal is transmitted to the same customer premises, but other configurations are possible in other embodiments. As a mere example, assume that one of the optical data signals carries data for the customer premises. In such an example, one of the modulation elements 152 modulates a plurality of electrical signals with such data and transmits the electrical signals via the conductive connections 73 to the transceivers 75.

Now assume that data is to be transmitted from the customer premises 41 to the network 22. The transceivers 75 (FIG. 2) modulate a plurality of electrical signals with the data and transmit such electrical signals via the conductive connections 73 to the arrayed media converter 70. One of modulation elements 152 receives the electrical signals, as shown by block 371 of FIG. 12, and demodulates the electrical signals to recover the data, as shown by block 373 of FIG. 12. The data is transmitted to an ONU 131, which modulates an optical data signal with the data, as shown by block 377 of FIG. 12.

In this regard, referring to FIG. 4, the color adaptive transmitter 144 of the foregoing ONU 131 transmits, based on the optical seed signal received by the ONU 131 from the passive multiplexer 58 (FIG. 3), an optical data signal at the wavelength of the optical seed signal. In addition, the transmitter 144 modulates this optical data signal with the data from the customer premises 41.

Figure 12:
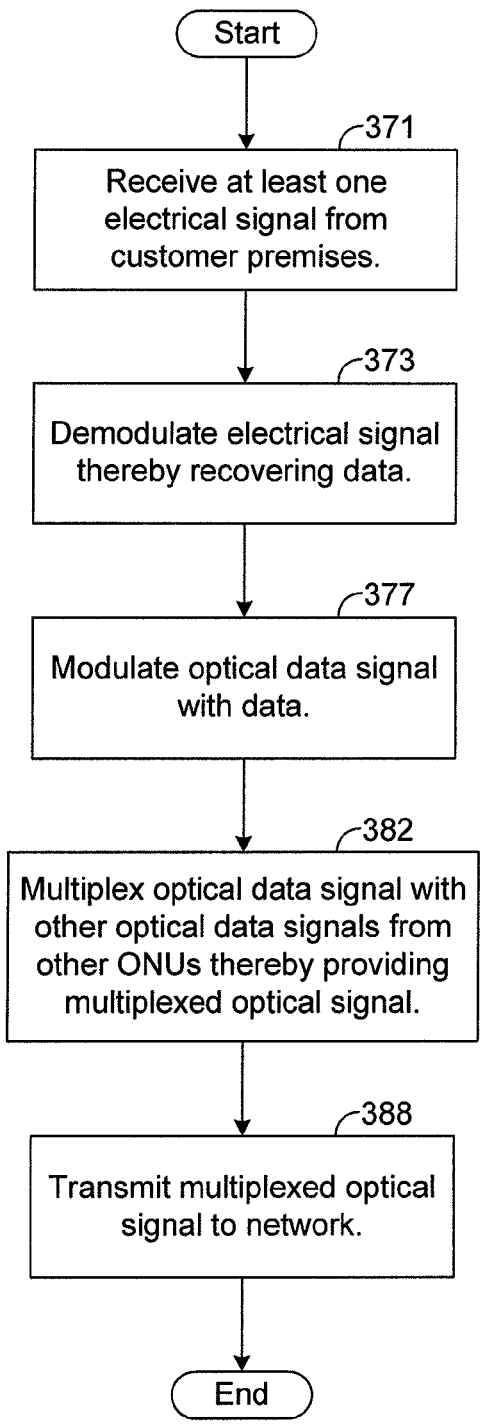
FIG. 12 is a flow chart illustrating an exemplary method for using the arrayed media converter depicted by FIG. 3 to transmit data from a customer premises to a network.

Referring to FIG. 3, the passive multiplexer 58 multiplexes the optical data signals transmitted by the ONUs 131 to form a multiplexed optical signal, as shown by block 382 of FIG. 12. The multiplexed optical signal is transmitted to the optical line terminal 52 via the optical fiber 27, as shown by block 388 of FIG. 12.

Thus, the arrayed media converter 70 converts optical signals from the network 22 into electrical signals for transmission to at least one customer premises, and the arrayed media converter 70 converts electrical signals from at least one customer premises into at least one optical signal for transmission to the network 22.

Figure 13:
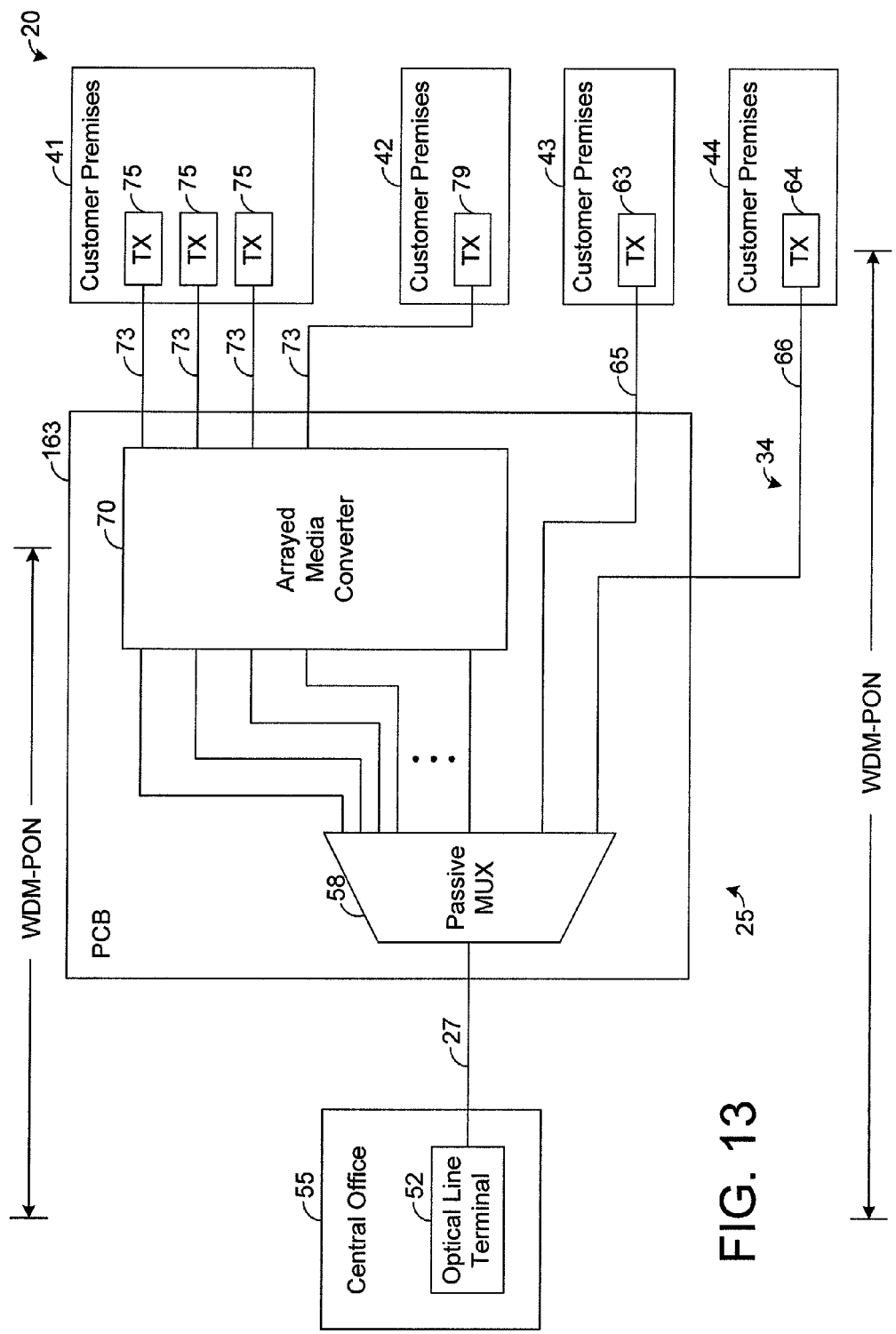
FIG. 13 is a block diagram illustrating an exemplary embodiment of the arrayed media converter depicted in FIG. 3.

In various embodiments described above, each ONU 131 is described as servicing a single respective customer premises. It should be noted that any of the ONUs 131 may be configured to service multiple customer premises. For example, FIG. 13 shows an exemplary embodiment in which the connections 73 extend to two customer premises 41, 42. In such an example, referring to FIG. 5, the optical signal received by the "ONU 1" carries data for both customer premises 41, 42. In one exemplary embodiment, the same data may be broadcast to both customer premises 41, 42. In such an embodiment, the "ONU 1" demodulates the optical signal to recover data carried by this signal, and the "Modulation Element 1" modulates at least one electrical signal with the data for transmission across at least one connection 73 to the customer premises 41. The "Modulation Element 1" also modulates at least one electrical signal with the same data for transmission across at least one connection 73 to the customer premises 42.

In another exemplary embodiment, unique data is transmitted to each customer premises 41, 42. In this regard, the optical signal received by the "ONU 1" carries data, referred to hereafter as "CP 41 Data," for transmission to the customer premises 41, and the optical signal received by the "ONU 1" carries data, referred to hereafter as "CP 42 Data," for transmission to the customer premises 42. Upon receiving the data recovered by the "ONU 1," the "Modulation Element 1" modulates at least one electrical signal with the CP 41 Data and transmits such modulated signal or signals only to customer premises 41. The "Modulation Element 1" also modulates at least one electrical signal with the CP 42 Data and transmits such modulated signal or signals only to customer premises 42.

Thus, each customer premises 41, 42 may receive the same data broadcast by the AMC 70, or each customer premises 41, 42 may receive unique data from the AMC 70. Regardless of whether data is broadcast from the AMC 70, the "Modulation Element 1" is configured to multiplex data from the customer premises 41 with data from the customer premises 42 such that the optical signal modulated by the "ONU 1" includes data from both customer premises 41, 42. Note that different customer premises 41, 42 may similarly receive unique data and/or broadcast data when the customer premises 41, 42 are serviced by different ONUs 131, as described above for the embodiment depicted by FIG. 2.

FIG. 13 shows the same ONU 131 servicing two customer premises 41, 42, but the same ONU 131 can be configured to service any number of customer premises in other embodiments. Further, it is possible for the same ONU 131 to broadcast the same data to each customer premises or a subset of the customer premises serviced by it, and it is also possible for the ONU 131 to transmit unique data to such customer premises as well. Thus, any customer premises may receive unique data as well as data broadcast from the AMC 70. Various other configurations and modifications would be apparent to one of ordinary skill upon reading this disclosure.

Now, therefore, the following is claimed:

1. An access multiplexer for multiplexing telecommunication signals, comprising:

a housing;

a passive multiplexer coupled to an optical line terminal of a telecommunication network via an optical fiber, the passive multiplexer configured to demultiplex a first multiplexed optical signal from the optical fiber thereby separating the first multiplexed optical signal into optical data signals; and an arrayed media converter having a plurality of optical network units that are situated in the housing and a plurality of modulation elements that are situated in the housing and coupled to conductive connections, the arrayed media converter configured to convert a plurality of the optical data signals into electrical signals, one of the optical network units having an optical receiver and a color adaptive optical transmitter, the optical receiver configured to receive and demodulate one of the optical data signals thereby recovering first data, one of the modulation elements coupled to the one optical network unit and a plurality of the conductive connections that extend from the one modulation element to at least one customer premises, the one modulation element configured to modulate a first plurality of electrical signals with the first data and to transmit the first plurality of electrical signals via the plurality of the conductive connections, the one modulation element configured to receive a second plurality of electrical signals and to demodulate the second plurality of electrical signals thereby recovering second data, the color adaptive optical transmitter configured to receive an optical seed signal and to modulate an optical signal with the second data, the color adaptive optical transmitter further configured to transmit, based on the optical seed signal, the modulated optical signal to the passive multiplexer at a wavelength of the optical seed signal, wherein the passive multiplexer is configured to multiplex the modulated optical signal with optical signals from the optical network units thereby providing a second multiplexed optical signal, the passive multiplexer further configured to transmit the second multiplexed optical signal to the optical line terminal via the optical fiber.

2. The access multiplexer of claim 1, wherein the housing is sealed.

3. The access multiplexer of claim 1, wherein the passive multiplexer is situated in the housing.

4. The access multiplexer of claim 1, wherein the optical seed signal is unmodulated.

5. The access multiplexer of claim 1, further comprising a signal handling element configured to split the one optical data signal thereby providing a portion of the one optical data signal to the optical transmitter as the optical seed signal.

6. The access multiplexer of claim 1, wherein the passive multiplexer has a plurality of channels, each of the channels passing light of a discrete wavelength range different than wavelength ranges of light passed by the other channels such that each of the optical network units receives from the passive multiplexer light in a different wavelength range relative to the wavelength ranges of light received by the other optical network units, wherein the optical seed signal and the one optical data signal both pass through the same channel of the passive multiplexer.

7. The access multiplexer of claim 1, further comprising an Ethernet cable having the plurality of the conductive connections.

8. The access multiplexer of claim 1, wherein the optical network units reside on a single printed circuit board (PCB).

9. The access multiplexer of claim 8, wherein the passive multiplexer resides on the PCB.

10. The access multiplexer of claim 1, wherein the arrayed media converter has a crosstalk canceler coupled to the conductive connections.

11. The access multiplexer of claim 1, wherein the arrayed media converter has a cross-connect switch coupled to the conductive connections.

12. The access multiplexer of claim 1, wherein the plurality of conductive connections extend to a plurality of customer premises, and wherein the one modulation element is configured to broadcast the first data to each of the customer premises.

13. The access multiplexer of claim 1, wherein the plurality of conductive connections extend to a plurality of customer premises, and wherein the one modulation element is configured to transmit a portion of the first data to one of the customer premises without transmitting the portion to other ones of the customer premises.

14. The access multiplexer of claim 1, further comprising a cable, wherein each of the plurality of conductive connections is bundled in the cable.

15. The access multiplexer of claim 1, further comprising a manager configured to manage each of the optical network units, wherein the manager is powered at least in part by electrical power transmitted to the access multiplexer from the at least one customer premises via the plurality of the conductive connections.

16. The access multiplexer of claim 1, further comprising a cross-connect switch situated in the housing and coupled to each of the plurality of conductive connections.

17. The access multiplexer of claim 1, further comprising a crosstalk canceler situated in the housing, the crosstalk canceler configured to estimate crosstalk interference between the first plurality of electrical signals or the second plurality of electrical signals, the crosstalk canceler further configured to cancel the estimated crosstalk interference.

18. An access multiplexer for multiplexing telecommunication signals, comprising:
a passive multiplexer coupled to an optical line terminal of a telecommunication network via an optical fiber, the passive multiplexer configured to demultiplex a first multiplexed optical signal from the optical fiber thereby separating the first multiplexed optical signal into optical data signals; and
an arrayed media converter having a plurality of optical network units and a plurality of modulation elements coupled to conductive connections, the arrayed media converter configured to convert a plurality of the optical data signals into electrical signals, one of the optical network units having an optical receiver and a color adaptive optical transmitter, the optical receiver configured to receive and demodulate one of the optical data signals thereby recovering first data, one of the modulation elements coupled to the one optical network unit and a plurality of the conductive connections, the one modulation element configured to modulate a first plurality of electrical signals with the first data and to transmit the first plurality of electrical signals via the plurality of the conductive connections, the one modulation element configured to receive a second plurality of electrical signals and to demodulate the second plurality of electrical signals thereby recovering second data, the color adaptive optical transmitter configured to receive an optical seed signal and to modulate an optical signal with the second data, the color adaptive optical transmitter further configured to transmit, based on the optical seed signal, the modulated optical signal to the passive multiplexer at a wavelength of the optical seed signal, wherein the passive multiplexer is configured to multiplex the modulated optical signal with optical signals from the optical network units thereby providing a second multiplexed optical signal, the passive multiplexer further configured to transmit the second multiplexed optical signal to the optical line terminal via the optical fiber;
a manager configured to manage each of the optical network units; and
a plurality of power interfaces, each of the power interfaces coupled to a respective one of the conductive connections and configured to provide electrical power from the respective conductive connection to the manager, the arrayed media converter coupled to a plurality of customer premises via the conductive connections.

19. The access multiplexer of claim 18, wherein at least one of the power interfaces is coupled to the one optical network unit such that each active component of the one optical network unit is powered via electrical power from at least one of the plurality of customer premises communicating data with the one optical network unit without being provided electrical power from any of the other customer premises serviced by the arrayed media converter.

20. An arrayed media converter, comprising:
a plurality of modulation elements situated in a housing; and
a plurality of optical network units situated in the housing and configured to receive a plurality of optical data signals, wherein the plurality of optical network units and the plurality of modulation elements are configured to convert a plurality of the optical data signals into electrical signals, one of the optical network units having an optical receiver and a color adaptive optical transmitter, the optical receiver configured to receive and demodulate one of the optical data signals thereby recovering first data, one of the modulation elements coupled to the one optical network unit and a plurality of conductive connections that extend from the one modulation element to a customer premises, the one modulation element configured to modulate a first plurality of electrical signals with the first data and to transmit the first plurality of electrical signals via the plurality of conductive connections, the one modulation element configured to receive a second plurality of electrical signals and to demodulate the second plurality of electrical signals thereby recovering second data, the color adaptive optical transmitter configured to receive an optical seed signal and to modulate an optical signal with the second data, the optical transmitter further configured to transmit, based on the optical seed signal, the modulated optical signal via an optical fiber at a wavelength of the optical seed signal.

21. A method, comprising the steps of:
providing an arrayed media converter, the arrayed media converter having a plurality of optical network units that are situated in a housing and a plurality of modulation elements that are situated in the housing and coupled to conductive connections, one of the optical network units having a color adaptive optical transmitter;

receiving a first multiplexed optical signal from an optical fiber coupled to an optical line terminal of a telecommunication network;

demultiplexing the first multiplexed optical signal via a passive multiplexer thereby separating the first multiplexed optical signal into optical data signals;

converting a plurality of the optical data signals into electrical signals via the arrayed media converter;

demodulating one of the optical data signals via the one optical network unit thereby recovering first data;

modulating a first plurality of electrical signals with the first data via one of the modulation elements;

transmitting the first plurality of electrical signals from the arrayed media converter via a plurality of the conductive connections that extend from the one modulation element to a customer premises;

receiving a second plurality of electrical signals from the conductive connections;

demodulating the second plurality of electrical signals via the one modulation element thereby recovering second data;

modulating an optical signal with the second data via the color adaptive optical transmitter;

transmitting, based on an optical seed signal, the modulated optical signal via the color adaptive optical transmitter at a wavelength of the optical seed signal;

multiplexing the modulated optical signal with optical signals from the optical network units thereby providing a second multiplexed optical signal; and transmitting the second multiplexed optical signal to the optical line terminal via the optical fiber.

22. The method of claim 21, wherein the housing is sealed.

23. The method of claim 21, wherein the passive multiplexer is situated in the housing.

24. The method of claim 21, wherein the optical seed signal is unmodulated.

25. The method of claim 21, further comprising the step of splitting the one optical data signal thereby providing a portion of the one optical data signal to the color adaptive optical transmitter as the optical seed signal.

26. The method of claim 21, wherein the passive multiplexer has a plurality of channels, each of the channels passing light of a discrete wavelength range different than wavelength ranges of light passed by the other channels such that each of the optical network units receives from the passive multiplexer light in a different wavelength range relative to the wavelength ranges of light received by the other optical network units, wherein the method further comprising the steps of:

passing the optical seed signal through one of the channels of the passive multiplexer; and passing the one optical data signal through the one channel.

27. The method of claim 21, wherein the transmitting the first plurality of electrical signals step comprises the step of broadcasting the first data to a plurality of customer premises.

28. The method of claim 21, wherein the transmitting the first plurality of electrical signals step comprises the steps of:

transmitting a first portion of the first data to a first customer premises; and transmitting a second portion of the first data to a second customer premises without transmitting the second portion to the first customer premises.

29. The method of claim 21, wherein the optical network units reside on a single printed circuit board (PCB).

30. The method of claim 29, wherein the passive multiplexer resides on the PCB.

31. A method, comprising the steps of:

providing an arrayed media converter, the arrayed media converter having a plurality of optical network units and a plurality of modulation elements coupled to conductive connections, one of the optical network units having a color adaptive optical transmitter, wherein the arrayed media converter has a manager for managing the optical network units;

receiving a first multiplexed optical signal from an optical fiber coupled to an optical line terminal of a telecommunication network;

demultiplexing the first multiplexed optical signal via a passive multiplexer thereby separating the first multiplexed optical signal into optical data signals;

converting a plurality of the optical data signals into electrical signals via the arrayed media converter;

demodulating one of the optical data signals via the one optical network unit thereby recovering first data;

modulating a first plurality of electrical signals with the first data via one of the modulation elements;

transmitting the first plurality of electrical signals from the arrayed media converter via a plurality of the conductive connections;

receiving a second plurality of electrical signals from the conductive connections;

demodulating the second plurality of electrical signals via the one modulation element thereby recovering second data;

modulating an optical signal with the second data via the color adaptive optical transmitter;

transmitting, based on an optical seed signal, the modulated optical signal via the color adaptive optical transmitter at a wavelength of the optical seed signal;

multiplexing the modulated optical signal with optical signals from the optical network units thereby providing a second multiplexed optical signal; and transmitting the second multiplexed optical signal to the optical line terminal via the optical fiber;

receiving electrical power from a plurality of customer premises being serviced by the arrayed media converter; and powering the manager via the electrical power such that powering of the manager is shared by each of the plurality of customer premises being serviced by the arrayed media converter.

32. The method of claim 31, further comprising the step of powering each active component of the one optical network unit with power received from at least one of the plurality of customer premises communicating data with the one optical network without providing electrical power to the one optical network unit from any of the other customer premises serviced by the arrayed media converter.

* * * * *